118,524

UNITED STATES PATENT OFFICE.

WILLIAM GARTON, OF SOUTHAMPTON, ENGLAND.

IMPROVEMENT IN THE MANUFACTURE OF INVERSE SUGARS FOR BREWING, &c.

Specification forming part of Letters Patent No. 118,524, dated August 29, 1871.

*To all whom it may concern:*

Be it known that I, WILLIAM GARTON, of Southampton, England, brewer, have invented or discovered certain new and useful Improvements in the Manufacture of Inverse Sugar, a saccharine material to be employed in brewing and wine-making; and I do hereby declare that the following is a full, clear, and exact description thereof—that is to say:

This invention has reference to the manufacture of inverse sugar, which is a saccharine material known in England as "Garton's saccharum" or "brewing saccharum," and used in brewing beer and in making wine.

This saccharum has hitherto been manufactured from cane sugar (commercially so called) by dissolving the sugar in water and submitting the solution to the combined action of heat and acid, and afterward neutralizing it by chalk or other suitable material; after the solution has been decolorized and concentrated, saccharum is obtained in a merchantable form and ready for use for the purposes above mentioned.

Now, instead of preparing saccharum from solutions obtained by dissolving manufactured cane sugar, my invention consists in preparing saccharum direct from the raw saccharine juices of the sugar-cane, or beet-root, or of other similar substances (such as sorghum, date, palm, maple, &c.) capable of producing inverted cane sugar; or in preparing it from sirups of the said substances—that is to say, from juices from which the water has been partially evaporated, or from the fluid portions of concentrated solutions separated from the early-formed crystallized sugar, or from residuary sirups obtained in the process of crystallizing sugar.

In carrying out the invention I add to the saccharine juice or sirup a suitable proportion of dilute sulphuric acid and raise it as quickly as possible to a temperature of about 160° to 212° Fahrenheit, the temperature required varying, according to the gravity of the juice or sirup and the amount of acid employed. I maintain this temperature for a period of from one to twelve hours; and when the conversion of the juice or sirup is complete I add to the solution some finely-ground animal charcoal and keep the solution well agitated for from a quarter of an hour to an hour, maintaining a high temperature, if necessary. I then neutralize the solution by chalk, lime, or other material, and separate the precipitate from the saccharine solution by subsidence or filtration. The solution may then, if necessary, be passed over animal charcoal and be concentrated, when it will be in a merchantable form and ready for use.

When lime is employed for the purpose of neutralizing, any excess may be removed by driving a current of carbonic-acid gas through the solution to form an insoluble carbonate of lime which will precipitate.

The operation of converting the juices or sirups, as before explained, may be considered complete when the solution, on examination by means of the polariscope, is found to have lost the dextro or right-handed rotary power of cane sugar and to have acquired the necessary lævo or left-handed rotary power of inverse sugar.

The proportion of acid I prefer to use in the case of cane-juice is from five to ten per cent. to the sugar present in the solution, the acid being of 1.18 specific gravity. In treating beet-juice an additional quantity of from ten to twenty-five per cent. of dilute acid will be required, on account of the alkaline salts contained in the beet.

The proportion of animal charcoal employed for the purpose hereinbefore explained will vary according to the quantity of acid used and according to the amount of nitrogenous matters and other impurities in the juices or sirups; from two to ten per cent. to the sugar present will generally be a suitable proportion, but even twenty per cent. may be used with advantage when large quantities of impurities are present.

When a large amount of salts is present in the sirups the excess may be got rid of, either before or after treatment, by an adaptation of Graham's dialyser, as is well understood.

A partial defecation may be obtained by using any other substance containing phosphate of lime instead of animal charcoal.

By manufacturing saccharum, as herein described, direct from saccharine juices or sirups, instead of, as formerly, from solutions obtained by dissolving manufactured cane sugar, I not only avoid the expense involved in the manufacture of the juices or sirups into sugar, but I produce saccharum of better quality and save at least twelve and one-half per cent. in the cost. In the manufacture of beer my saccharum is mixed with malt-wort and hops and fermented in the usual way; or it may be used in conjunction with a proportion of dextro-glucose, such as is made from amylaceous substances.

In wine-making the saccharum is mixed either with malt-wort or with grape-juice and then fermented.

What I claim, and desire to secure by Letters Patent, is—

The manufacture of the saccharine material herein called "saccharum" (and which is a comparatively pure inverse sugar) direct from raw saccharine juices, or from sirups, such sirups being juices from which the water has been partially evaporated, or being the fluid portions of concentrated solutions separated from the early-formed crystallized sugar, or being residuary sirups obtained in the process of crystallizing sugar.

In witness whereof I, the said WILLIAM GARTON, have hereunto set my hand this 20th day of June, 1871.

WM. GARTON.

Witnesses:
   W. THURSTON WAITE,
         Southampton.
   J. F. LITTLETON,
         Southampton.